(12) United States Patent
Amhal et al.

(10) Patent No.: US 12,531,509 B2
(45) Date of Patent: Jan. 20, 2026

(54) ADJUSTING AND MEASURING METHOD AND SYSTEM FOR A PHOTOVOLTAIC POWER PLANT

(71) Applicant: COMMISSARIAT A L'ENERGIE ATOMIQUE ET AUX ENERGIES ALTERNATIVES, Paris (FR)

(72) Inventors: Mohamed Amhal, Grenoble (FR); Hervé Buttin, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 137 days.

(21) Appl. No.: 18/520,429

(22) Filed: Nov. 27, 2023

(65) Prior Publication Data
US 2024/0178790 A1 May 30, 2024

(30) Foreign Application Priority Data
Nov. 29, 2022 (FR) ...................................... 2212518

(51) Int. Cl.
*H02S 50/10* (2014.01)

(52) U.S. Cl.
CPC .................................... *H02S 50/10* (2014.12)

(58) Field of Classification Search
CPC ...................................................... H02S 50/10
See application file for complete search history.

(56) References Cited

U.S. PATENT DOCUMENTS

| | | | |
|---|---|---|---|
| 6,772,077 B1 * | 8/2004 | Parker ................. | H02H 1/0015 361/63 |
| 11,843,349 B2 * | 12/2023 | Gostein ................. | G01R 21/06 |
| 12,107,541 B2 * | 10/2024 | Chen ....................... | H02S 50/10 |

FOREIGN PATENT DOCUMENTS

| | | |
|---|---|---|
| CN | 114 553 138 A | 5/2022 |
| EP | 3 349 317 A1 | 7/2018 |
| FR | 3 060 229 A1 | 6/2018 |

OTHER PUBLICATIONS

Jordan, et al., "Compendium of Photovoltaic Degradation Rates", Prog. Photovolt: Res. Appl., vol. 24, pp. 978-989, 2016.

* cited by examiner

*Primary Examiner* — Reena Aurora
(74) *Attorney, Agent, or Firm* — BakerHostetler

(57) ABSTRACT

A method for adjusting and measuring a photovoltaic power plant including a photovoltaic string having solar panels in series and an inverter to convert a DC voltage generated by the photovoltaic string into an AC voltage, the inverter having a DC-voltage inputs, includes:

measuring a frequency of an AC voltage generated by the photovoltaic power plant and computing a frequency variation of the AC voltage with respect to a reference frequency and computing a power variation applied by the photovoltaic power plant based on the frequency variation, selecting a DC-voltage input, being the i-th input, to measure a curve of current vs. voltage of the input, having an initial DC voltage, then computing a residual power variation applied by the photovoltaic power plant if the residual power variation is non-zero, distributing it over inputs different from the i-th input, repeating the steps to create different points of the measured curve.

16 Claims, 6 Drawing Sheets

US 12,531,509 B2

ADJUSTING AND MEASURING METHOD AND SYSTEM FOR A PHOTOVOLTAIC POWER PLANT

CROSS-REFERENCE TO RELATED APPLICATION

This application claims priority to foreign French patent application No. FR 2212518, filed on Nov. 29, 2022, the disclosure of which is incorporated by reference in its entirety.

FIELD OF THE INVENTION

The present invention relates to the field of adjustment and measurement of a photovoltaic power plant and more particularly to measurement of the curves of "current as a function of voltage" required to perform diagnostics on the solar panels of the photovoltaic power plant.

BACKGROUND

As known, a photovoltaic power plant comprises a plurality of panels connected in series, which are connected to an inverter. An inverter is an element configured to convert a DC voltage generated by series-connected photovoltaic panels into an AC voltage. Large photovoltaic systems may comprise a plurality of strings (a plurality of series-connected panels) and a plurality of inverters.

A photovoltaic power plant may be subject to degradation of a number of different types, including shading, soiling, aging, etc. For example, aging is generally due to a loss of short-circuit current as a result of decolorization and delamination of the encapsulant, leading to an average drop in power of 0.5% per annum (see "Compendium of Photovoltaic Degradation Rates", D. C. Jordan, et al, NREL, 2015).

In order to maximize the generation of a photovoltaic system throughout its life (usually 25 years), the operator needs to detect degradation and to optimize maintenance actions.

Analysis of a curve of "generated current as a function of voltage" ("IV curve" below) is a preferred way of detecting degradation and quantifying losses. An IV curve deforms under the effect of degradation and recognition of the shape of the deformation allows the type of degradation to be identified. FIG. 1 is a graphical representation of IV curves of a prior-art photovoltaic system. The IV curve C1 is typical of a photovoltaic system exhibiting no degradation while curve C2 is typical of a photovoltaic system exhibiting degradation related to soiling of the module.

However, it is expensive to measure the IV curve of a photovoltaic system because it requires equipment and labour, as well as generation in at least part of the power plant to be stopped for a time. Specifically, an IV measurement generally lasts several seconds. During this time, the power of the photovoltaic power plant is reduced partially or completely, to allow the voltage adjustment required by the measurements. At each voltage value, a measurement of generated current is performed. For stability purposes, the voltage must be maintained for a minimum time around a value.

Photovoltaic power plants, like any other means of generation connected to a mains grid, must participate in the effort required to maintain the stability of the grid in terms of frequency and voltage. This requires the power generated by photovoltaic power plants to be offered or adjusted upwards (to increase injected power) or bid or adjusted downwards (to decrease injected power).

To make the power of a photovoltaic power plant vary, the power of each inverter/string is varied. Document FR3060229 for example addresses the subject of participation of photovoltaic power plants in frequency adjustment. This document specifically relates to computation of a reference power, with a view to estimating the reserve power available at any given time.

However, no prior-art document describes a solution allowing system services (frequency and voltage adjustment) to be provided at the same time as the IV curve of each photovoltaic sub-system (for example the various inputs of the inverters) is measured.

SUMMARY OF THE INVENTION

The invention aims to solve this problem by sharing the required effort between the various voltage inputs of the various inverters, in order to allow the frequency and voltage delivered by the photovoltaic power plant to be adjusted while measuring, at the same time, the IV curve of the inputs.

To this end, one subject of the invention is an adjusting and measuring method for a photovoltaic power plant comprising at least one photovoltaic string, each photovoltaic string comprising solar panels connected in series and comprising an inverter configured to convert a DC voltage generated by said photovoltaic string into an AC voltage, each inverter having at least one DC-voltage input, said method comprising the following steps:

A. measuring a frequency f of an AC voltage generated by said photovoltaic power plant, computing a frequency variation $\Delta f$ of said AC voltage with respect to a predetermined reference frequency $f_{ref}$ such that: $\Delta f = f - f_{ref}$ and computing a power variation $\Delta P$ to be applied by the photovoltaic power plant based on said frequency variation, B. if $\Delta P = 0$, repeating step A, otherwise: selecting a DC-voltage input from the M>1 DC-voltage inputs, this input being referred to as the i-th input with i an integer ranging from 1 to M, in order to start or resume a measurement of a curve of "current as a function of voltage" of the i-th input, the i-th input having what is referred to as an initial DC voltage $V_{ini}$, then measuring a power $P_i$ generated by the inverter of the i-th input, and creating a measurement point of abscissa $x = V_{ini}$ and of ordinate $y = P_i / V_{ini}$ on said curve of "current as a function of voltage", C. if a DC-voltage control range of the i-th input, which range is formed of what is referred to as a maximum DC voltage $V_{max}$ of the i-th input and of what is referred to as minimum DC voltage $V_{min}$ of the i-th input, is unknown: determining, by applying a voltage or power setpoint to the i-th input depending on said power measurement $P_i$, the maximum voltage $V_{max}$ and the minimum voltage $V_{min}$ of the i-th input,

C'.:

applying a voltage $V_n(p)$ to the i-th input, with p an integer comprised between 1 and N>1 referred to as the measurement point, said voltage $V_n(p)$ being different from the p−1 voltages $V_n(q)$ for q ranging from 1 to p−1 and being comprised between the maximum voltage $V_{max}$ and the minimum voltage $V_{min}$, then, measuring a power $P_i(p)$ generated by the inverter of the i-th input and creating a p-th measurement point on said curve of "current as a function of voltage" of abscissa $x=V_n(p)$ and of ordinate $y=P_i(p)/V_n(p)$, D. computing what is referred to as a residual power variation $\Delta P'$ to be applied by said photovoltaic power plant such that $\Delta P'=\Delta P-(P_i(p)-P_i)$, E. if $\Delta P'\neq 0$: cancelling said residual power variation $\Delta P'$ by distributing said variation over inputs different from the i-th input, F. repeating steps C' to E a plurality of times, incrementing p between each iteration, so as to create a plurality of different measurement points of said measured curve of "current as a function of voltage".

According to one embodiment, when a number of created measurement points of said curve of "current as a function of voltage" of the i-th input is equal to N at the end of step F, steps A to F are repeated incrementing i so as to start or resume a measurement of a curve of "current as a function of voltage" of an input different from the i-th input.

According to one embodiment, steps A to F are repeated incrementing i so as to start or resume a measurement of a curve of "current as a function of voltage" of the M inputs, until N measurement points have been obtained for each of the M inputs.

According to one embodiment, when a new frequency variation $\Delta f'$ of said AC voltage generated by said photovoltaic power plant with respect to the reference frequency $f_{ref}$, measured in step F is greater than a predetermined threshold $f_{lim}$, steps A to F are repeated. Preferably, the predetermined frequency-threshold value is 5 mHz.

According to one embodiment, steps A-E of the method of the invention are implemented in a predetermined time interval. Preferably, a duration of said predetermined time interval is equal to 10 s.

According to one embodiment, if $P_i \leq |\Delta P|$, step C consists in determining an open-circuit voltage $V_{oc}$ of the i-th input, the maximum voltage $V_{max}$ being equal to the open-circuit voltage $V_{oc}$ of the i-th input, the minimum voltage $V_{min}$ then being a predetermined voltage of the i-th input.

According to one embodiment, if $P_i > |\Delta P|$, step C consists in applying a power setpoint $P_i+\Delta P$ to the i-th input by increasing voltage until said maximum voltage $V_{max}$ is reached, the minimum voltage $V_{min}$ then being equal to $V_{ini}$.

According to one embodiment, the power variation $\Delta P$ is computed using the following equation: $\Delta P=-k\times\Delta f$, with k a parameterizable positive constant expressing a level of commitment declared by an operator of the photovoltaic power plant.

According to one embodiment, step E consists in:
i. applying power setpoints to inputs different from the i-th input, so as to modify a power generated by said power plant by a value equal to said residual power variation $\Delta P'$, or
ii. repeating steps B to D, incrementing i, and with $\Delta P=\Delta P'$, so as to start or resume a measurement of a curve of "current as a function of voltage" of a voltage input different from the i-th input, said measurement of the i-th input then being suspended.

Preferably, in step E-i, a value $Pc_j$ of said power setpoint of each input j different from i is proportional to a power $P_j$ generated by said input j such that said value $Pc_j$ of said power setpoint of each input j is equal to:

$$Pc_j = P_j + \frac{P_j}{\sum_{k\neq i} P_k} \times \Delta P'$$

Alternatively, in step E-ii, measurements of curves of "current as a function of voltage" of a plurality of inputs are performed in parallel by incrementing the measurement point p simultaneously for all the inputs for which a curve of "current as a function of voltage" is being measured.

According to one embodiment, the method comprises a step of correcting said curve of "current as a function of voltage" based on illuminance measurements and/or temperature measurements performed on said at least one photovoltaic string during implementation of said steps.

According to one embodiment, the initial voltage $V_{ini}$ of the i-th input is a voltage at which a power generated by the photovoltaic string associated with the i-th input is maximum.

Another subject of the invention is an adjusting and measuring system for a photovoltaic power plant comprising:

at least one photovoltaic string, each photovoltaic string comprising solar panels connected in series and comprising an inverter configured to convert a DC voltage generated by said photovoltaic string into an AC voltage, each inverter having at least one DC-voltage input, voltage sensors configured to measure a voltage applied to each inverter, a frequency sensor configured to measure a frequency f of an AC voltage generated by said photovoltaic power plant, power sensors configured to measure a power generated by said photovoltaic power plant and a power generated by each inverter, a processor configured to perform the following steps:

$f\Delta ff_{ref}\Delta f=f-f_{ref}\Delta P\Delta P=0$, $M>1$, $V_{ini}P_ix=V_{ini}y=P_i/V_{ini}\text{-}V_{max}V_{min}P_iV_{max}V_{min}V_n(p)pN>1V_n(p)p-1V_n(q)qp-1V_{max}V_{min}P_i(p)x=V_ny=P_i(p)/V_n(p)\Delta P'\Delta P'=\Delta P-(P_i(p)-P_i)\Delta P'\neq 0$: $\Delta P'$pA.measuring, via said frequency sensor, said frequency, computing a frequency variation of said AC voltage with respect to a predetermined reference frequency such that: and computing a power variation to be applied by the photovoltaic power plant based on said frequency variation, $f\Delta ff_{ref}\Delta f=f-f_{ref}\Delta P\Delta P=0$, $M>1$, $V_{ini}P_ix=V_{ini}y=P_i/V_{ini}\text{-}V_{max}V_{min}P_iV_{max}V_{min}V_n(p)pN>1V_n(p)p-1V_n(q)qp-1V_{max}V_{min}P_i(p)x=V_ny=P_i(p)/V_n(p)\Delta P'\Delta P'=\Delta P-(P_i(p)-P_i)\Delta P'\neq 0$: $\Delta P'$pB.if, repeating step A, otherwise: selecting a DC-voltage input from the DC-voltage inputs, this input being referred to as the i-th input with i an integer ranging from 1 to in order to start or resume a measurement of a curve of "current as a function of voltage" of the i-th input, the i-th input having what is referred to as an initial DC voltage, then measuring a power generated by the inverter of the i-th input, and creating a measurement point of abscissa and of ordinate on said curve of "current as a function of voltage", $f\Delta ff_{ref}\Delta f=f-f_{ref}\Delta P\Delta P=0$, $M>1$, $V_{ini}P_ix=V_{ini}y=P_i/V_{ini}\text{-}V_{max}V_{min}P_iV_{max}V_{min}V_n(p)pN>1V_n(p)p-1V_n(q)qp-1V_{max}V_{min}P_i(p)x=V_ny=P_i(p)/V_n(p)\Delta P'\Delta P'=\Delta P-(P_i(p)-P_i)\Delta P'\neq 0$: $\Delta P'$pC.if a DC-voltage control range of the i-th input, which range is formed of what is referred to as a maximum DC voltage of the i-th input and of what is referred to as minimum DC voltage of the i-th input, is unknown: determining, by applying a voltage or power setpoint to the i-th input depending on said power measurement, the maximum voltage and the minimum voltage of the i-th input, $f\Delta ff_{ref}\Delta f=f-f_{ref}\Delta P\Delta P=0$, $M>1$, $V_{ini}P_ix=V_{ini}y=P_i/V_{ini}-V_{max}V_{min}P_iV_{max}V_{min}V_n(p)pN>1V_n(p)p-1V_n(q)qp-1V_{max}V_{min}P_i(p)x=V_ny=P_i(p)/V_n(p)\Delta P'\Delta P'=\Delta P-(P_i(p)-P_i)\Delta P'\neq 0$: $\Delta P'pC'$:

$f\Delta ff_{ref}\Delta f=f-f_{ref}\Delta P\Delta P=0$, $M>1$, $V_{ini}P_ix=V_{ini}y=P_i/V_{ini}-V_{max}V_{min}P_iV_{max}V_{min}V_n(p)pN>1V_n(p)p-1V_n(q)qp-1V_{max}V_{min}P_i(p)x=V_ny=P_i(p)/V_n(p)\Delta P'\Delta P'=\Delta P-(P_i(p)-P_i)\Delta P'\neq 0$: $\Delta P'p$ applying a voltage to the i-th input, with an integer comprised between 1 and called the measurement point, said voltage being different from the voltages for ranging from 1 to and being comprised between the maximum voltage and the minimum voltage, then measuring a power generated by the inverter of the i-th input and creating a p-th measurement point on said curve of "current as a function of voltage" of abscissa (p) and of ordinate, $f\Delta ff_{ref}\Delta f=f-f_{ref}\Delta P\Delta P=0$, $M>1$, $V_{ini}P_ix=V_{ini}y=P_i/V_{ini}-V_{max}V_{min}P_iV_{max}V_{min}V_n(p)pN>1V_n(p)p-1V_n(q)qp-1V_{max}V_{min}P_i(p)x=V_ny=P_i(p)/V_n(p)\Delta P'\Delta P'=\Delta P-(P_i(p)-P_i)\Delta P'\neq 0$: $\Delta P'pD$.computing what is referred to as a residual power variation to be applied by said photovoltaic power plant such that $f\Delta ff_{ref}\Delta f=f-f_{ref}\Delta P\Delta P=0$, $M>1$, $V_{ini}P_ix=V_{ini}y=P_i/V_{ini}-V_{max}V_{min}P_iV_{max}V_{min}V_n(p)pN>1V_n(p)p-1V_n(q)qp-1V_{max}V_{min}P_i(p)x=V_ny=P_i(p)/V_n(p)\Delta P'\Delta P'=\Delta P-(P_i(p)-P_i)\Delta P'\neq 0$: $\Delta P'pE$.if cancelling said residual power variation by distributing said variation over inputs different from the i-th input, $f\Delta ff_{ref}\Delta f=f-f_{ref}\Delta P\Delta P=0$, $M>1$, $V_{ini}P_ix=V_{ini}y=P_i/V_{ini}-V_{max}V_{min}P_iV_{max}V_{min}V_n(p)pN>1V_n(p)p-1V_n(q)qp-1V_{max}V_{min}P_i(p)x=V_ny=P_i(p)/V_n(p)\Delta P'\Delta P'=\Delta P-(P_i(p)-P_i)\Delta P'\neq 0$: $\Delta P'pF$. repeating steps C' to E a plurality of times, incrementing between each iteration, so as to create a plurality of measurement points of said measured curve of "current as a function of voltage".

Preferably, the system further comprises a temperature sensor configured to measure a temperature of said at least one photovoltaic string and/or comprising an illuminance sensor configured to measure an illuminance on said at least one photovoltaic string, said processor further being configured to correct said curve of "current as a function of voltage" based on illuminance measurements and/or temperature measurements performed during implementation of said steps.

BRIEF DESCRIPTION OF THE DRAWINGS

Other features, details and advantages of the invention will become apparent on reading the description given with reference to the appended drawings, which are given by way of example and which show, respectively.

In the figures, unless otherwise indicated, elements have not been shown to scale.

DETAILED DESCRIPTION

Figure 2A:
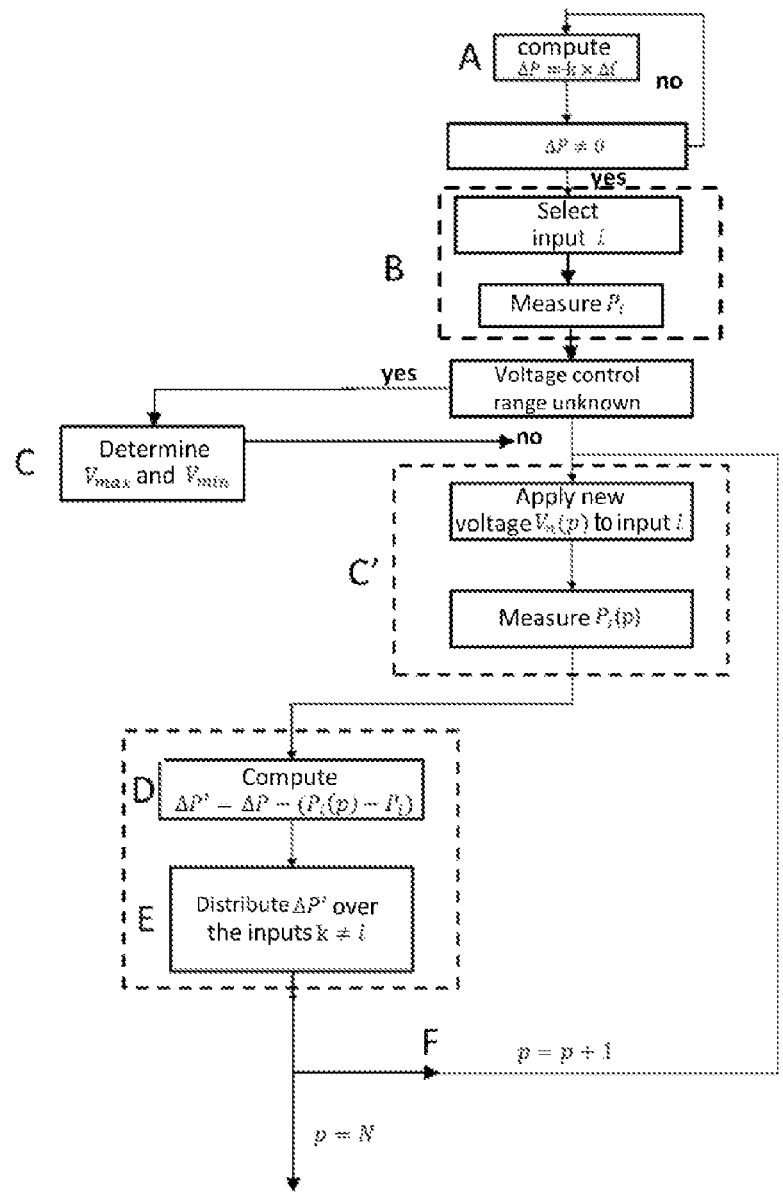

FIG. 2A schematically illustrates an adjusting and measuring method according to the invention for a photovoltaic power plant.

Figure 2B:
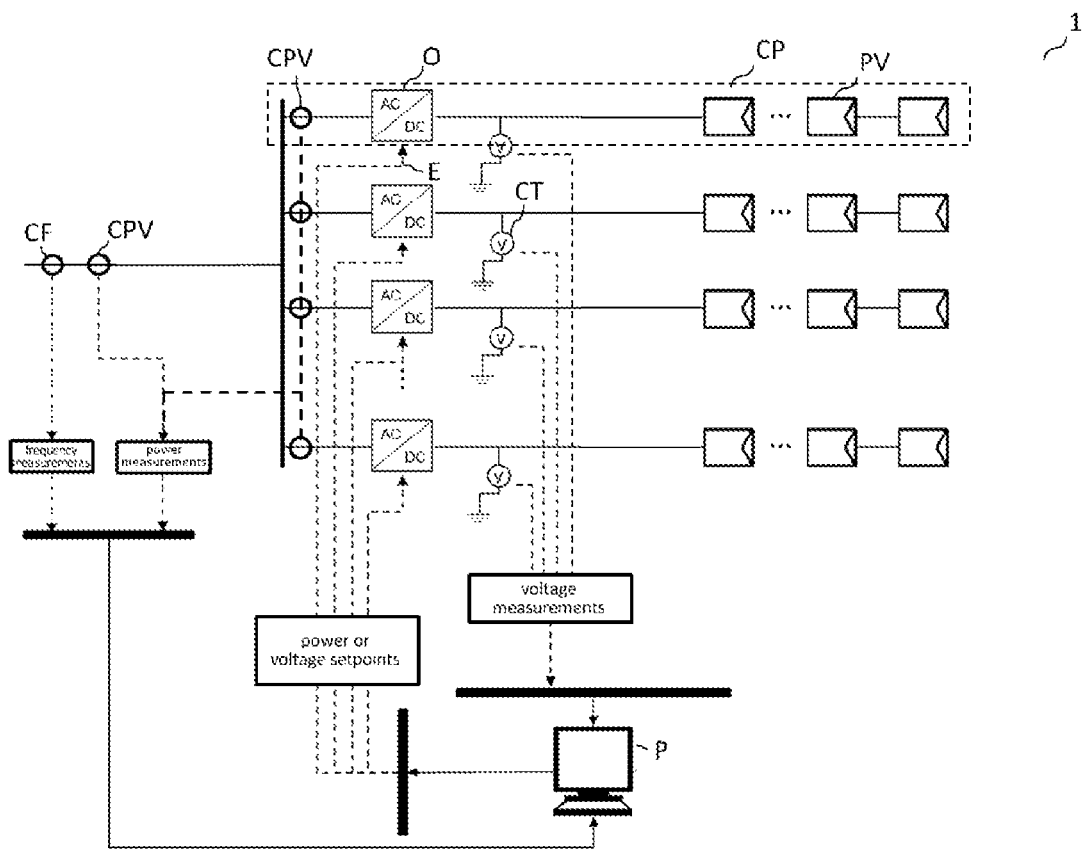

FIG. 2B is a schematic representation of an adjusting and measuring system 1 according to the invention for a photovoltaic power plant and particularly suitable for implementing the method of FIG. 2A.

The system 1 of the invention comprises at least one photovoltaic string CP. Each photovoltaic string CP comprises solar panels PV connected in series and a respective inverter O.

By way of non-limiting example, the system of FIG. 2B comprises four photovoltaic strings CP. According to one embodiment different from that illustrated, the system 1 comprises a high number of strings CP, and typically a number of strings greater than or equal to 10.

It will be recalled that an inverter O is configured to convert a DC voltage generated by a photovoltaic string into an AC voltage. Each inverter O accepts the setting for its DC voltage or its AC power via one or more control inputs E. In the system 1, the setpoints are generated by a processor P controlled by the operator of the photovoltaic power plant. By way of non-limiting example, in the system of FIG. 2B, each inverter O has one control input E, the purpose of which is to control the DC-voltage delivered to the inverter. To simplify the description of the invention, the total number of control inputs is here considered to equal M>1 and these inputs are numbered from 1 to M. Similarly, the DC-voltage inputs delivered by the photovoltaic strings CP are also considered to be M>1 in number and these inputs are numbered from 1 to M.

Figure 1:
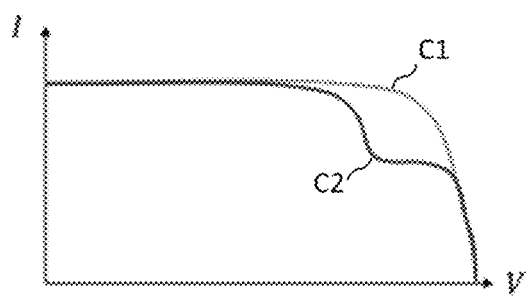
FIG. 1, a graphical representation of IV curves of a prior-art photovoltaic system, FIG. 2A, a schematic representation of an adjusting and measuring method for a photovoltaic power plant according to the invention, FIG. 2B, a schematic representation of an adjusting and measuring system for a photovoltaic power plant according to the invention and particularly suitable for implementing the method of FIG. 2A, FIG. 3, a schematic representation of a preferred embodiment of the method of the invention, FIG. 4, a graphical representation of the IV curve of an input in the case where $P_i \leq |\Delta P|$, FIG. 5, a graphical representation of the IV curve and power curve as a function of voltage of an input in the case where $P_i > |\Delta P|$, FIG. 6, a schematic representation of a preferred embodiment of the system of the invention, further comprising a temperature sensor Temp and an illuminance sensor PD.

The system 1 of the invention further comprises voltage sensors CT configured to measure a voltage applied to each inverter O and current sensors (not shown in FIG. 1) configured to measure a current applied to each inverter O. Moreover, the system 1 comprises a frequency sensor CF configured to measure the frequency f of the AC voltage generated by the photovoltaic power plant. This frequency f is typically the frequency of the grid at the injection point.

In addition, the system 1 comprises power sensors CPV configured to measure a power generated by each inverter and by the power plant.

The processor P of system 1 is configured to execute a plurality of steps allowing the frequency and voltage delivered by the photovoltaic power plant to be adjusted while at the same time measuring the IV curve of one or more inputs, without requiring electricity generation to be stopped for a time. Thus, the availability of the photovoltaic power plant is improved by the method and system of the invention.

The steps implemented by the processor P correspond to those of the method of the invention, the steps of which are shown in FIG. 2A.

In a first step A, a measurement of the frequency f is performed via the frequency sensor CF. In addition, step A comprises computing a frequency variation of the AC voltage with respect to a predetermined reference frequency $f_{ref}$: $\Delta f=f-f_{ref}$. The reference frequency is a frequency set by the operator of the photovoltaic power plant or the grid operator using the photovoltaic power plant. This reference frequency is the grid frequency used by the operator. It is for example equal to $f_{ref}$=50 Hz in Europe. The method of the invention is implemented only when the system is able to deliver a bid, i.e. when the measurement of step A has made it possible to identify that $f>f_{ref}$ (and therefore $\Delta f>0$). It will be understood that the system 1 of the invention may be configured to deliver both a bid ($f>f_{ref}$) and an offer ($f<f_{ref}$). Lastly, step A comprises computing a power variation $\Delta P$ to be applied by the photovoltaic power plant in order to contribute to the adjustment of the frequency variation $\Delta f$. That is to say, it is sought to modify the frequency f by the value $\Delta f$ by varying the power P generated by the plant and injected into the network. In practice, many generating means will have to jointly contribute and only their combined effort will make it possible to adjust the frequency variation $\Delta f$ to 0, and therefore ultimately obtain a power variation $\Delta P$ equal to 0.

Preferably, as illustrated in FIG. 2A, the power variation $\Delta P$ is computed in the following way: $\Delta P=-k\times\Delta f$, with k a parameterizable positive constant expressing a level of commitment declared by an operator of the photovoltaic power plant to the grid operator. As explained above, the method of the invention is implemented when the system is delivering a bid, i.e. when $\Delta P<0$.

If $\Delta P=0$ then the processor P repeats step A until a non-zero power variation $\Delta P$ is measured.

If $\Delta P\neq 0$, this means that a variation in the power of the plant must be applied to help adjust frequency. Also, in a step B, the processor P is configured to select a DC-voltage input from the M DC-voltage inputs, this input being referred to as the i-th input, with i an integer ranging from 1 to M, in order to start or resume a measurement of the IV curve of the i-th input. The i-th input is also considered to have a DC voltage, referred to as the initial voltage $V_{ini}$, across its terminals. This voltage $V_{ini}$ is by default (but not necessarily) a voltage regulated by an MPPT function (MPPT standing for Maximum Power Point Tracker) allowing the voltage across the terminals of the photovoltaic string to be adjusted in order to maximize the generated power. Furthermore, in step B, the processor is configured to measure, with one of the power sensors CPV, the power $P_i$ generated by the inverter of the i-th DC-voltage input. In addition, the processor creates a measurement point of abscissa $x=V_{ini}$ and of ordinate $y=P_i/V_{ini}$ of the IV curve of the i-th input.

After step B, the processor implements a step C or a step C' depending on whether the DC-voltage control range of the i-th input is known by the processor P. This control range is characterized by what is referred to as a maximum DC voltage $V_{max}$ of the i-th input and what is referred to as a minimum DC voltage $V_{min}$ of the i-th input. Specifically, in order to carry out the most complete characterization of degradation and to better quantify losses, it is preferable to plot the IV curve of an input over the largest possible voltage range and it is therefore necessary to determine $V_{max}$ and $V_{min}$.

In the case where the control range is unknown, the processor implements step C, which consists in determining the maximum voltage $V_{max}$ and the minimum voltage $V_{min}$ of the control range of the i-th input, by applying a voltage or power setpoint to the i-th input depending on the power measurement $P_i$. The setpoint is generated by the processor P. Following this step C, the processor will implement step C', because the limits of the control range of the i-th input will then be known.

Figure 3:
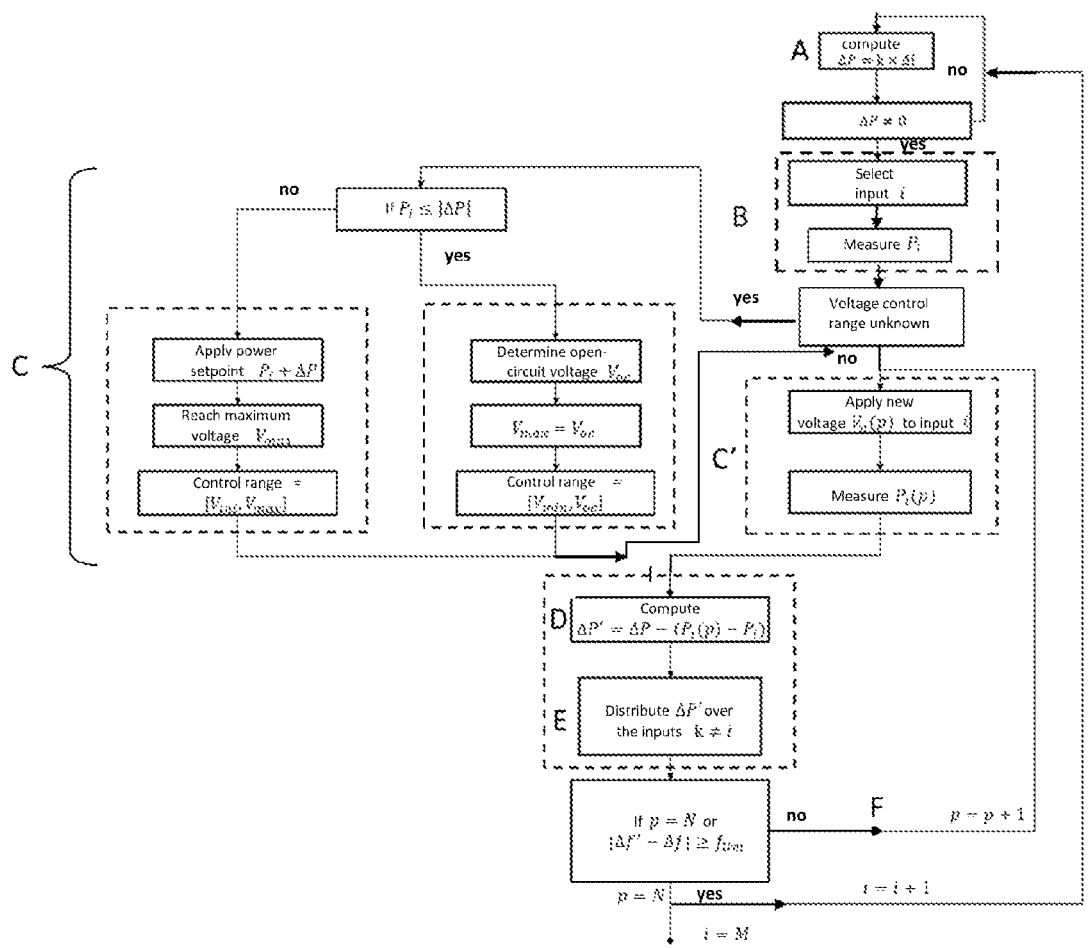

FIG. 3, detailed below, gives an example of a preferred implementation of step C.

In the case where the control range of the i-th input is known (for example after step C), the processor implements step C', which consists in applying a voltage setpoint of value $V_n(p)$ to the i-th input, with p an integer ranging from 1 to N>1 called the measurement point. In order to record different measurement points of the IV curve, each voltage $V_n(p)$ is different from the p−1 voltages $V_n(q)$ for q ranging from 1 to p−1 and is comprised between the maximum voltage $V_{max}$ and the minimum voltage $V_{min}$ (both of which are known in step C'). Lastly, the processor measures the power $P_i(p)$ generated by the i-th input for this new p, and creates a p-th measurement point on said curve of "current as a function of voltage" of abscissa $x=V_n(p)$ and of ordinate $y=P_i(p)/V_n(p)$.

Following the modification of voltage or power via the setpoint generated by the processor P, in a step D what is referred to as a residual power variation $\Delta P'$ to be applied by the photovoltaic power plant to achieve the adjustment is computed. The residual power variation equals $\Delta P'=\Delta P-(P_i(p)-P_i)$.

If $\Delta P'\neq 0$ then, in a step E, the processor P decreases the residual power variation $\Delta P'$ to zero (or in other words cancels it out) by distributing it over inputs different from the i-th input. This step E may be implemented in a number of ways.

According to a first embodiment, step E consists in applying power setpoints to inputs different from the i-th input, so as to modify a power generated by said power plant by a cumulative value equal to the residual power variation $\Delta P'$. To this end, preferably, a value $Pc_j$ of the power setpoint of each input j different from i is proportional to a power $P_j$ generated by said input j. More precisely, to distribute the residual power variation $\Delta P'$, the value $Pc_j$ of the power setpoint of each input j different from the i-th input is equal to $$Pc_j = P_j + \frac{P_j}{\sum_{k\neq i} P_k} \times \Delta P'.$$

This first embodiment makes it possible to add redundancy and thus reduce the impact on overall generation of a large local variation in the power of the inverter/inverters allowing the power bid to be delivered.

Alternatively, according to a second embodiment, step E consists in repeating steps B to D, incrementing i, and with $\Delta P=\Delta P'$ so as to start or resume a measurement of the IV curve of an input i+1 different from the i-th input. In this case, the measurement of the IV curve of the i-th input is suspended, for example until the measurement of input i+1 is completed. The second embodiment is particularly advantageous when the system comprises inverters delivering different powers. Specifically, the second embodiment then allows one inverter to be used instead of another to meet the condition $P_i\leq\Delta P$ and thus allows the open-circuit voltage $V_{oc}$ of the corresponding input to be determined.

According to a variant of the second embodiment, in step E, the measurements of IV curves of a plurality of inputs are performed in parallel by incrementing the measurement point p simultaneously for all the inputs being measured. This variant thus makes it possible to perform IV characterizations on a plurality of subsystems simultaneously. In addition, this variant makes it possible to plot the IV curve of various inputs under similar illuminance and temperatures conditions and therefore not to add bias to cross comparison of the IV characteristics.

Following step E, the residual power is therefore distributed between the various inputs so as to be decreased to zero (cancelled), and the contribution of the plant to the frequency adjustment is achieved.

If ΔP'=0 then this step E is not required, and step F is passed to directly.

Lastly, in order to plot an IV curve of the i-th usable input, it is necessary to measure a plurality of points. To this end, the processor P is configured to implement a last step F. Step F consists in repeating steps C' to E a plurality of times, incrementing p between each iteration, so as to create a plurality of measurement points of the measured IV curve, for example until N measurement points are obtained. More precisely, the processor applies new voltage setpoints of values different from those of the previous voltage setpoints, the value of each setpoint being comprised between $V_{min}$ and $V_{max}$.

Thus, at the end of the method, the system 1 will have allowed the photovoltaic power plant to contribute to the frequency adjustment and the IV curve of at least one input to be obtained, without requiring electricity generation to be stopped for a time. To this end, the control voltage of one or more inputs is computed in order to make it possible to scan the entire possible voltage range and to record the IV curve associated with this input. A mutualization between the various inputs makes it possible to ensure the response to system services in an overall manner. The method of the invention therefore allows an increase in the availability of the photovoltaic power plant and a decrease in the cost associated with the characterization of degradation.

In a manner known per se, the one or more IV curves obtained will subsequently be used to detect degradation of the photovoltaic system.

Preferably, steps A to E of the method of the invention, which contribute to frequency adjustment, are all implemented in a predetermined time interval. This time interval corresponds to the maximum time for implementing a power setpoint requested by the service contractor. Still preferably, the predetermined time interval has a duration equal to 10 s.

FIG. 3 schematically illustrates a preferred embodiment of the method of the invention comprising an example of implementation of step C.

In this embodiment, step C, which consists in determining $V_{max}$ and $V_{min}$ of the control range of the i-th input via a voltage or power setpoint, is performed in two different ways depending on the measurement of the power $P_i$.

First of all, if $P_i \le |\Delta P|$ then cancellation of the power of the i-th input is insufficient to apply the power variation ΔP. In this case, step C is performed by setting a voltage of the i-th input. More precisely, step C consists in setting the i-th input to its maximum voltage rating $V_{max,s}$. Since this voltage is greater than the open-circuit voltage $V_{oc}$, the voltage setting $V_{max,s}$ allows the voltage $V_{oc}$ to be measured, which then corresponds to the voltage $V_{max}$ of the control range of the i-th input. A measurement point of the IV curve of abscissa $x=V_{oc}$ and of ordinate $y=I(V_{oc})=0$ is therefore obtained. In this particular case, the minimum voltage $V_{min}$ of the control range is equal to the minimum voltage rating of the i-th input, which is a predetermined voltage.

Figure 4:
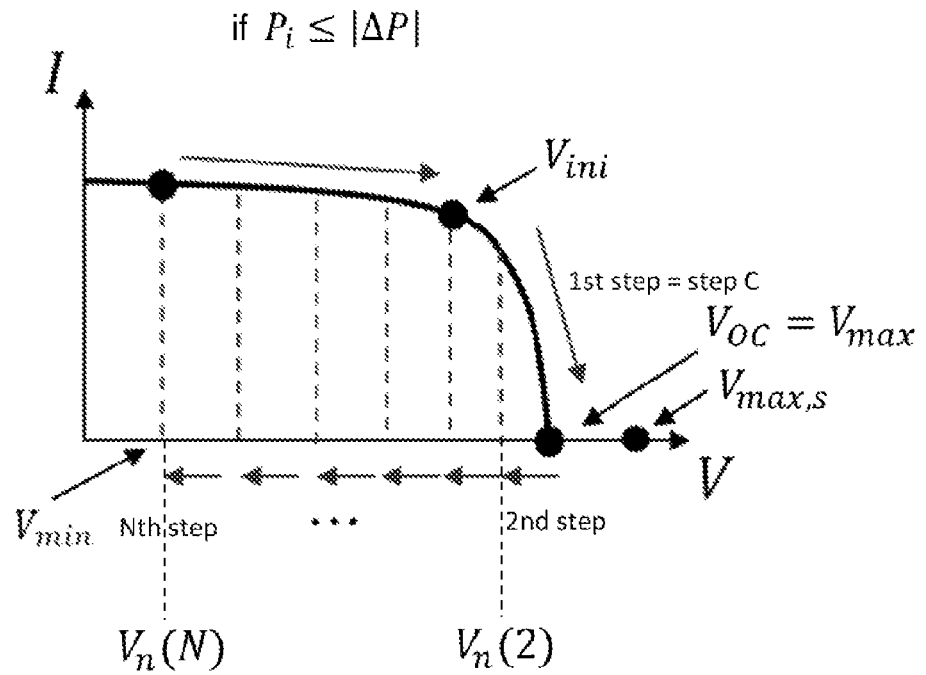

FIG. 4 is a graphical representation of the IV curve of an input in the case where $P_i \le |\Delta P|$, in which various steps required to obtain the IV curve are detailed. FIG. 4 shows step C, which consists in determining the open-circuit voltage $V_{oc}$, and which is the first step of plotting the IV curve after the initial point of abscissa $x=V_{ini}$ has been obtained. FIG. 4, by way of illustrative example, shows various voltage setpoint values $V_n(p)$ (from p=2 to p=N) of value $V_n(p)$ of the i-th input that are used to plot the IV curve.

Alternatively, in the case where $P_i > |\Delta P|$, step C is performed by setting a power of the i-th input. Preferably, step C consists in setting the i-th input to the power $P_i + \Delta P$ by increasing voltage until a maximum voltage, at which the power generated has varied by ΔP, is reached. This maximum voltage corresponds to the voltage $V_{max}$ of the control range of the i-th input. Thus, a measurement point of the IV curve of abscissa $x=V_{max}$ and of ordinate $y=(P_i+\Delta P)/V_{max}$ is therefore obtained.

In this particular case, the minimum voltage $V_{min}$ of the control range is equal to the initial voltage $V_{ini}$ of the i-th input. This voltage $V_{ini}$ is preferably a voltage regulated by an MPPT function, i.e. the voltage allowing the power generated by the photovoltaic string associated with the characterized input to be maximized.

Figure 5:
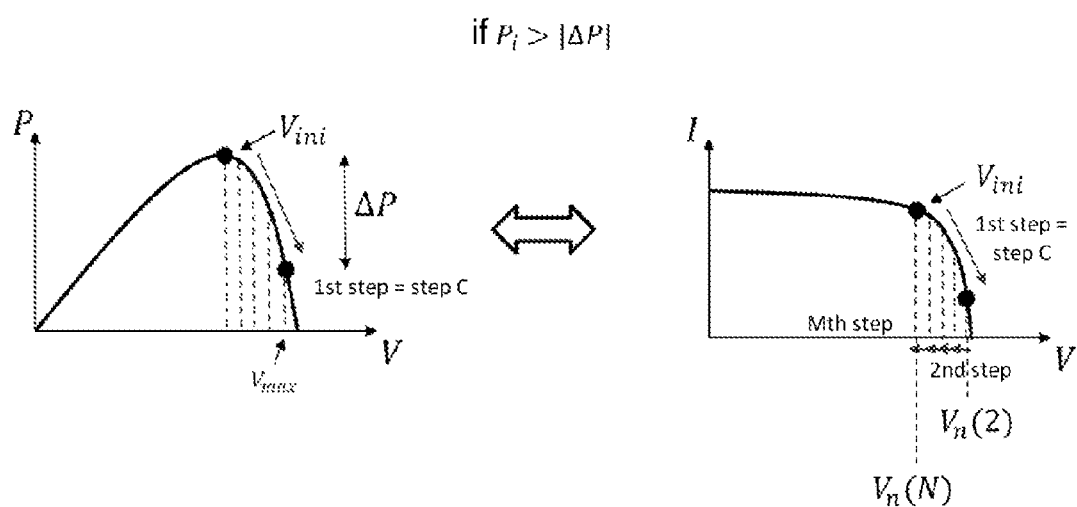

FIG. 5 is a representation of the IV curve (on the right) and of the curve of power as a function of voltage (on the left) of an input in the case where $P_i > |\Delta P|$, and in which various steps required to obtain these curves are detailed. FIG. 5 shows step C, which consists in achieving the maximum voltage $V_{max}$ by setting the i-th input to the power $P_i + \Delta P$, and which is the first step of plotting the IV curve (after the initial point of abscissa $x=V_{ini}$ has been obtained). In FIG. 5, by way of illustrative example, the voltage $V_{ini}$ corresponds to a maximum of the generated power. In addition, FIG. 5 illustrates various voltage setpoint values $V_n(p)$ (from p=2 to p=N) of value $V_n(p)$ of the i-th input that are used to plot the IV curve.

In the embodiment of FIG. 3, the method comprises an additional step, which consists in repeating steps A through F incrementing i so as to start or resume a measurement of the IV curve of an input different from the i-th input when a number of created measurement points of the IV curve of the i-th input is equal to a predetermined number N at the end of step F. In other words, this additional step consists in:

stopping step F when the IV curve of the i-th input comprises N measurement points, then repeating the method of the invention for another input (incrementing i) in order to obtain its IV curve or, where appropriate, resuming measurement of its IV curve if measurement thereof was interrupted in step E.

This additional step allows a more complete characterization of the photovoltaic power plant. Preferably, this additional step is repeated a sufficient number of times to obtain the IV curve of each of the M inputs, in order to carry out a complete characterization of degradation of the photovoltaic power plant.

When implementing step F, it is preferable to ensure that the underlying data have not changed too much from when step A was implemented. Thus, preferably, as illustrated in the method of FIG. 3, during the execution of step F, measurements of delivered frequency are carried out in order to ensure that it remains sufficiently stable and, if too great a deviation in frequency is observed, then the method is restarted from its first step. That is to say, when a new frequency variation Δf' of the generated AC voltage with respect to a reference frequency $f_{ref}$ is measured in step F and is greater than a predetermined threshold $f_{lim}$ (i.e. when $|\Delta f' - \Delta f| \ge f_{lim}$) steps A to F are repeated. Preferably, the predetermined frequency-threshold value is equal to 5 mHz because this corresponds to an intermediate value between the required measurement resolution (+/−1 mHz) and the maximum uncertainty in this measurement (+/−10 mHz), as currently specified for PFR service in France. The expression "maximum uncertainty" is understood to mean the maximum permissible value of the error in measurement of frequency. The expression "measurement resolution" is understood to mean the difference between the measured value and the exact value of the physical quantity.

Figure 6:
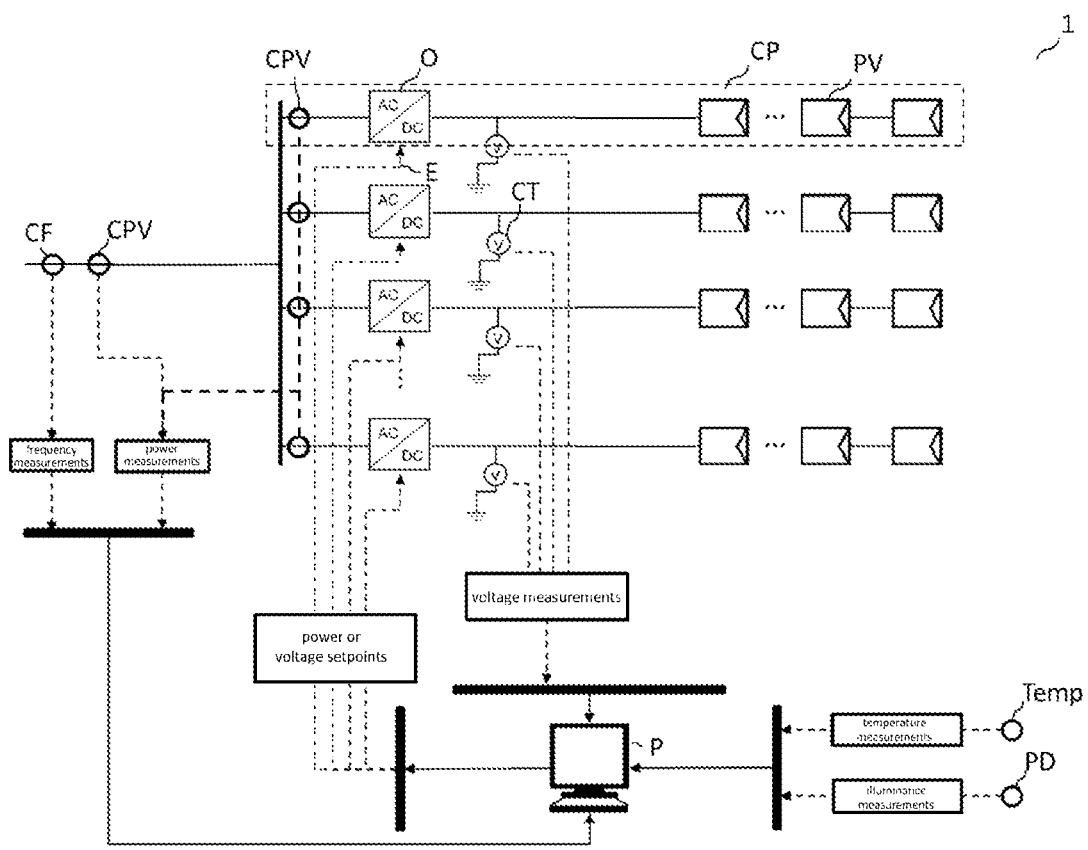

In a manner known per se, variations in the temperature of and illuminance on the photovoltaic strings will lead to variations in the measurement of the IV curve that will not be due to degradation of the solar panels. Such variations are therefore likely to distort the characterization of degradation of the solar panels. In order to avoid these errors, FIG. 6 illustrates a preferred embodiment in which the system of the invention further comprises a temperature sensor Temp and an illuminance sensor PD configured to measure the temperature of and illuminance on the photovoltaic strings, respectively. In addition, the P processor is configured to correct the curve of "current as a function of voltage" based on the illuminance and temperature measurements taken. The characterization of degradation is therefore more reliable in the embodiment of FIG. 6. According to one embodiment different from that illustrated in FIG. 6, the system 1 comprises a temperature sensor Temp or an illuminance sensor PD.

By way of non-limiting example, the illuminance sensor PD is a photodiode.

The invention claimed is:

1. An adjusting and measuring method for a photovoltaic power plant comprising at least one photovoltaic string (CP), each photovoltaic string (CP) comprising solar panels (PV) connected in series and comprising an inverter (O) configured to convert a DC voltage generated by said photovoltaic string into an AC voltage, each inverter having at least one DC-voltage input, said method comprising the following steps:
  A. measuring a frequency f of an AC voltage generated by said photovoltaic power plant, computing a frequency variation $\Delta f$ of said AC voltage with respect to a predetermined reference frequency $f_{ref}$ such that: $\Delta f = f - f_{ref}$ and computing a power variation $\Delta P$ to be applied by the photovoltaic power plant based on said frequency variation, said power variation $\Delta P$ being computed using the equation $\Delta P = -k \times \Delta f$, with k a parameterizable positive constant expressing a level of commitment declared by an operator of the photovoltaic power plant,
  B. if $\Delta P = 0$, repeating step A, otherwise: selecting a DC-voltage input from the M>1 DC-voltage inputs, this input being referred to as the i-th input with i an integer ranging from 1 to M, in order to start or resume a measurement of a curve of "current as a function of voltage" of the i-th input, the i-th input having what is referred to as an initial DC voltage $V_{ini}$, then measuring a power $P_i$ generated by the inverter of the i-th input, and creating a measurement point of abscissa $x = V_{ini}$ and of ordinate $y = P_i/V_{ini}$ on said curve of "current as a function of voltage",
  C. if a DC-voltage control range of the i-th input, which range is formed of what is referred to as a maximum DC voltage $V_{max}$ of the i-th input and of what is referred to as minimum DC voltage $V_{min}$ of the i-th input, is unknown: determining, by applying a voltage or power setpoint to the i-th input depending on said power measurement $P_i$, the maximum voltage $V_{max}$ and the minimum voltage $V_{min}$ of the i-th input,
  C'. applying a voltage $V_n(p)$ to the i-th input, with p an integer comprised between 1 and N>1 called the measurement point, said voltage $V_n(p)$ being different from the p−1 voltages $V_n(q)$ for q ranging from 1 to p−1 and being comprised between the maximum voltage $V_{max}$ and the minimum voltage $V_{min}$, then measuring a power $P_i(p)$ generated by the inverter of the i-th input and creating a p-th measurement point on said curve of "current as a function of voltage" of abscissa $x = V_n(p)$ and of ordinate $y = P_i(p)/V_n(p)$,
  D. computing what is referred to as a residual power variation $\Delta P'$ to be applied by said photovoltaic power plant such that $\Delta P' = \Delta P - (P_i(p) - P_i)$,
  E. if $\Delta P' \neq 0$: cancelling said residual power variation $\Delta P'$ by distributing said variation over inputs different from the i-th input,
  F. repeating steps C' to E a plurality of times, incrementing p between each iteration, so as to create a plurality of different measurement points of said measured curve of "current as a function of voltage".

2. The method according to claim 1, wherein, when a number of created measurement points of said curve of "current as a function of voltage" of the i-th input is equal to N at the end of step F, steps A to F are repeated incrementing i so as to start or resume a measurement of a curve of "current as a function of voltage" of an input different from the i-th input.

3. The method according to claim 1, wherein steps A to F are repeated incrementing i so as to start or resume a measurement of a curve of "current as a function of voltage" of the M inputs, until N measurement points have been obtained for each of the M inputs.

4. The method according to claim 1, wherein, when a new frequency variation $\Delta f'$ of said AC voltage generated by said photovoltaic power plant with respect to the reference frequency $f_{ref}$, measured in step F is greater than a predetermined threshold $f_{lim}$, steps A to F are repeated.

5. The method according to claim 4, wherein said predetermined frequency-threshold value is 5 mHz.

6. The method according to claim 1, wherein steps A-E of the method of the invention are implemented in a predetermined time interval.

7. The method according to claim 6, wherein a duration of said predetermined time interval is equal to 10 s.

8. The method according to claim 1, wherein if $P_i \leq |\Delta P|$, step C consists in determining an open-circuit voltage $V_{oc}$ of the i-th input, the maximum voltage $V_{max}$ being equal to the open-circuit voltage $V_{oc}$ of the i-th input, the minimum voltage $V_{min}$ then being a predetermined voltage of the i-th input.

9. The method according to claim 1, wherein, if $P_i > |\Delta P|$, step C consists in applying a power setpoint $P_id + \Delta P$ to the i-th input by increasing voltage until said maximum voltage $V_{max}$ is reached, the minimum voltage $V_{min}$ then being equal to $V_{ini}$.

10. The method according to claim 1, wherein step E consists in:
  i. applying power setpoints to inputs different from the i-th input, so as to modify a power generated by said power plant by a value equal to said residual power variation $\Delta P'$, or
  ii. repeating steps B to D, incrementing i, and with $\Delta P = \Delta P'$, so as to start or resume a measurement of a curve of "current as a function of voltage" of a voltage input different from the i-th input, said measurement of the i-th input then being suspended.

11. The method according to claim 10, wherein, in step E-i, a value $Pc_j$ of said power setpoint of each input j different from i is proportional to a power $P_j$ generated by said input j such that said value Pc of said power setpoint of each input j is equal to:

$$Pc_j = P_j + \frac{P_j}{\sum_{k \neq i} P_k} \times \Delta P'.$$

12. The method according to claim 10, wherein, in step E-ii, measurements of curves of "current as a function of voltage" of a plurality of inputs are performed in parallel by incrementing the measurement point p simultaneously for all the inputs for which a curve of "current as a function of voltage" is being measured.

13. The method according to claim 1, comprising a step of correcting said curve of "current as a function of voltage" based on illuminance measurements and/or temperature measurements performed on said at least one photovoltaic string during implementation of said steps.

14. The method according to claim 1, wherein the initial voltage $V_{ini}$ of the i-th input is a voltage at which a power generated by the photovoltaic string associated with the i-th input is maximum.

15. An adjusting and measuring system for a photovoltaic power plant comprising:
- at least one photovoltaic string (CV), each photovoltaic string comprising solar panels (PV) connected in series and comprising an inverter (O) configured to convert a DC voltage generated by said photovoltaic string into an AC voltage, each inverter having at least one DC-voltage input, voltage sensors (CT) configured to measure a voltage applied to each inverter,
- a frequency sensor (CF) configured to measure a frequency f of an AC voltage generated by said photovoltaic power plant,
- power sensors (CPV) configured to measure a power generated by said photovoltaic power plant and a power generated by each inverter, a processor (P) configured to perform the following steps:
  - A. measuring, via said frequency sensor, said frequency f, computing a frequency variation Δf of said AC voltage with respect to a predetermined reference frequency $f_{ref}$ such that: $\Delta f = f - f_{ref}$ and computing a power variation ΔP to be applied by the photovoltaic power plant based on said frequency variation, said power variation ΔP being computed using the equation $\Delta P = -k \times \Delta f$, with k a parameterizable positive constant expressing a level of commitment declared by an operator of the photovoltaic power plant,
  - B. if ΔP=0, repeating step A, otherwise: selecting a DC-voltage input from the DC-voltage inputs, this input being referred to as the i-th input with i an integer ranging from 1 to M>1, in order to start or resume a measurement of a curve of "current as a function of voltage" of the i-th input, the i-th input having what is referred to as an initial DC voltage $V_{ini}$, then measuring a power $P_i$ generated by the inverter of the i-th input, and creating a measurement point of abscissa $x = V_{ini}$ and of ordinate $y = P_i/V_{ini}$ on said curve of "current as a function of voltage",
  - C. if a DC-voltage control range of the i-th input, which range is formed of what is referred to as a maximum DC voltage $V_{max}$ of the i-th input and of what is referred to as minimum DC voltage $V_{min}$ of the i-th input, is unknown: determining, by applying a voltage or power setpoint to the i-th input depending on said power measurement $P_i$, the maximum voltage $V_{max}$ and the minimum voltage $V_{min}$ of the i-th input,
  - C'. applying a voltage $V_n(p)$ to the i-th input, with p an integer comprised between 1 and N>1 called the measurement point, said voltage $V_n(p)$ being different from the p−1 voltages $V_n(q)$ for q ranging from 1 to p−1 and being comprised between the maximum voltage $V_{max}$ and the minimum voltage $V_{min}$, then measuring a power $P_i(p)$ generated by the inverter of the i-th input and creating a p-th measurement point on said curve of "current as a function of voltage" of abscissa $x = V_n(p)$ and of ordinate $y = P_i(p)/V_n(p)$,
  - D. computing what is referred to as a residual power variation ΔP' to be applied by said photovoltaic power plant such that $\Delta P' = \Delta P - (P_i(p) - P_i)$,
  - E. if ΔP'≠0: cancelling said residual power variation ΔP' by distributing said variation over inputs different from the i-th input,
  - F. repeating steps C' to E a plurality of times, incrementing p between each iteration, so as to create a plurality of measurement points of said measured curve of "current as a function of voltage".

16. A system according to claim 15, further comprising a temperature sensor (Temp) configured to measure a temperature of said at least one photovoltaic string and/or comprising an illuminance sensor (PD) configured to measure an illuminance on said at least one photovoltaic string, said processor further being configured to correct said curve of "current as a function of voltage" based on illuminance measurements and/or temperature measurements performed during implementation of said steps.

* * * * *